(12) United States Patent
Okumura et al.

(10) Patent No.: US 9,086,021 B2
(45) Date of Patent: Jul. 21, 2015

(54) INTAKE APPARATUS OF ENGINE

(75) Inventors: Takeshi Okumura, Sunto-gun (JP); Manabu Tateno, Sunto-gun (JP); Naoto Hisaminato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 402 days.

(21) Appl. No.: 13/499,477

(22) PCT Filed: Oct. 19, 2010

(86) PCT No.: PCT/JP2010/068319
§ 371 (c)(1),
(2), (4) Date: Mar. 30, 2012

(87) PCT Pub. No.: WO2011/055629
PCT Pub. Date: May 12, 2011

(65) Prior Publication Data
US 2012/0210979 A1 Aug. 23, 2012

(30) Foreign Application Priority Data
Nov. 5, 2009 (JP) ................................. 2009-253992

(51) Int. Cl.
*F01L 1/26* (2006.01)
*F02D 13/02* (2006.01)
(Continued)

(52) U.S. Cl.
CPC .............. *F02D 13/0226* (2013.01); *F01L 1/181* (2013.01); *F01L 3/06* (2013.01); *F02B 31/085* (2013.01); *F02D 13/0257* (2013.01);
(Continued)

(58) Field of Classification Search
CPC .......... F02D 2041/001; F02D 13/0207; F02D 13/0257
USPC .......... 123/90.11, 90.15–90.18, 90.23, 90.24, 123/90.39–90.41, 308, 445
See application file for complete search history.

(56) References Cited

U.S. PATENT DOCUMENTS 4,191,140 A * 3/1980 Matsumoto et al. ...... 123/184.42
4,354,463 A * 10/1982 Otani et al. ................... 123/308
(Continued)

FOREIGN PATENT DOCUMENTS

CN     1538045 A    10/2004
EP     1405993 A2 *  4/2004 .............. F02B 31/04
(Continued)

OTHER PUBLICATIONS

International Search Report issued in Application No. PCT/JP2010/068319; Dated Nov. 16, 2010 (With Translation).

*Primary Examiner* — Stephen K Cronin
*Assistant Examiner* — Joseph Dallo
(74) *Attorney, Agent, or Firm* — Oliff PLC

(57) ABSTRACT

An intake apparatus of an engine includes: a first intake passage supplying fresh air to a cylinder; a second intake passage arranged near the first intake passage, and supplying fresh air to the cylinder; a first intake valve opening and closing the first intake passage at an aperture of the first intake passage; a second intake valve opening and closing the second intake passage at an aperture of the second intake passage. An opening timing of the first intake valve of the intake apparatus advances relative to a top dead center, and a valve lift amount of the first intake valve differs from that of the second intake valve, and there is a period while the valve lift amount of the first intake valve is larger than that of the second intake valve, in an intake stroke.

8 Claims, 7 Drawing Sheets

(51) Int. Cl.
  *F01L 1/18*    (2006.01)
  *F01L 3/06*    (2006.01)
  *F02B 31/08*   (2006.01)
  *F01L 1/24*    (2006.01)
  *F01L 1/344*   (2006.01)
  *F01L 1/053*   (2006.01)
  *F02B 17/00*   (2006.01)
  *F02M 35/10*   (2006.01)

(52) U.S. Cl.
  CPC ............... *F01L 1/185* (2013.01); *F01L 1/2405* (2013.01); *F01L 1/344* (2013.01); *F01L 2001/0537* (2013.01); *F01L 2105/00* (2013.01); *F01L 2800/06* (2013.01); *F01N 2240/36* (2013.01); *F02B 17/00* (2013.01); *F02M 35/10177* (2013.01); *Y02T 10/146* (2013.01); *Y02T 10/18* (2013.01)

(56)           References Cited

U.S. PATENT DOCUMENTS

| | | | |
|---|---|---|---|
| 4,570,590 | A   | 2/1986  | Kawai et al. |
| 4,703,734 | A   | 11/1987 | Aoyama et al. |
| 4,856,473 | A * | 8/1989  | Kawai et al. ............... 123/308 |
| 6,019,079 | A * | 2/2000  | Sakurahara et al. ....... 123/193.6 |
| 6,138,651 | A * | 10/2000 | Mori et al. ............... 123/568.17 |
| 6,397,813 | B1* | 6/2002  | Han et al. ..................... 123/308 |
| 6,425,357 | B2* | 7/2002  | Shimizu et al. ............ 123/90.16 |
| 6,748,919 | B2* | 6/2004  | Abo et al. ..................... 123/299 |
| 6,868,823 | B2* | 3/2005  | Sakai et al. .................. 123/306 |
| 2001/0037797 | A1* | 11/2001 | Arai et al. ..................... 123/480 |
| 2002/0112692 | A1* | 8/2002  | Abo et al. ..................... 123/295 |
| 2003/0127063 | A1* | 7/2003  | Wang ........................ 123/90.16 |
| 2004/0226535 | A1* | 11/2004 | Sakai ............................ 123/308 |
| 2004/0231638 | A1  | 11/2004 | Tominaga et al. |
| 2004/0237931 | A1* | 12/2004 | Okamoto et al. ............. 123/308 |
| 2005/0022761 | A1  | 2/2005  | Asami et al. |
| 2006/0185646 | A1  | 8/2006  | Heel et al. |
| 2006/0219202 | A1* | 10/2006 | Abe et al. ................. 123/184.56 |
| 2007/0215106 | A1* | 9/2007  | Petridis et al. ................ 123/347 |
| 2008/0087242 | A1* | 4/2008  | Nakamura .................. 123/90.17 |
| 2008/0223338 | A1* | 9/2008  | Reed et al. ................ 123/406.12 |
| 2008/0275621 | A1* | 11/2008 | Kobayashi .................... 701/103 |
| 2008/0295788 | A1* | 12/2008 | Flierl et al. .................. 123/90.16 |
| 2009/0071431 | A1* | 3/2009  | Fujimori et al. ......... 123/184.55 |
| 2009/0093950 | A1* | 4/2009  | Yi et al. ........................ 701/105 |
| 2009/0159041 | A1* | 6/2009  | Andou et al. ................. 123/306 |
| 2010/0212618 | A1  | 8/2010  | Murata |

FOREIGN PATENT DOCUMENTS

| | | |
|---|---|---|
| EP | 1 469 175 A2    | 10/2004 |
| JP | A-61-218726     | 9/1986  |
| JP | A-05-133212     | 5/1993  |
| JP | A-08-260925     | 10/1996 |
| JP | A-10-026026     | 1/1998  |
| JP | A-2004-183510   | 7/2004  |
| JP | A-2005-042607   | 2/2005  |
| JP | A-2006-161666   | 6/2006  |
| JP | A-2008-202406   | 9/2008  |
| JP | A-2009-103108   | 5/2009  |
| JP | A-2009-228640   | 10/2009 |
| WO | WO 2004/074659 A1 | 9/2004 |

* cited by examiner

# INTAKE APPARATUS OF ENGINE

TECHNICAL FIELD

The present invention relates to an intake apparatus of an engine using a high expansion ratio cycle.

BACKGROUND ART

Conventionally, an engine with a high expansion ratio cycle has been practically used, thereby increasing a high efficiency of the engine and making the expansion ratio higher than the compression ratio during the combustion cycle. According to Patent Document 1, in the engine with the high expansion ratio cycle, the closing timing of an intake valve is retarded to make the expansion ratio higher than the compression ratio during the combustion cycle. This reduces the pump loss (pumping loss), which improves the heat efficiency and avoids knocking.

PRIOR ART DOCUMENT

Patent Document

[Patent Document 1] Japanese Patent Application Publication No. 2004-183510

SUMMARY OF THE INVENTION

Problems to be Solved by the Invention

Incidentally, in the compression stroke of the engine, the fuel-air mixture introduced to a cylinder is subject to the shearing stress by a change in a flow velocity, and then is compressed with turbulence generated. This turbulence uniformly spreads the fuel-air mixture in the cylinder, thereby ensuring the stable combustion. However, as for an engine with a high expansion ratio cycle by retarding the intake valve closing timing, that is, by a so-called intake valve retard closing, the intake valve continues opening until the middle of the compression stroke. For this reason, the air-fuel mixture flows through the intake passage, so that the turbulence of the air-fuel mixture in the cylinder is dramatically attenuated. Specifically, at the time when the intake valve closes after passing the middle of the compression stroke, the turbulence of the air-fuel mixture in the cylinder is almost lost, which may arise a problem of the unstable combustion.

It is therefore an object of the present invention to reduce pumping loss of an engine, achieve stable combustion, and improve fuel consumption.

Means for Solving the Problems

In order to solve the above problem, an intake apparatus of an engine according to the present invention includes: a first intake passage supplying fresh air to a cylinder; a second intake passage arranged near the first intake passage, and supplying fresh air to the cylinder; a first intake valve opening and closing the first intake passage at an aperture of the first intake passage; and a second intake valve opening and closing the second intake passage at an aperture of the second intake passage, wherein an opening timing of the first intake valve advances relative to a top dead center, and a valve lift amount of the first intake valve differs from that of the second intake valve, and there is a period while the valve lift amount of the first intake valve is larger than that of the second intake valve, in an intake stroke.

With such a configuration, the intake air flows out of the first intake passage with the first intake valve having a large lift amount toward the second intake passage with the second intake valve having a small lift amount. This flow out generates the rotational flow along an inner circumferential wall of the cylinder. Also, this causes the introduced flesh air to flow out, thereby making the expansion ratio larger than the compression ratio in the cylinder. Thus, this reduces the pumping loss. At this time, the flesh air flows through the second intake passage, so that unbalance of the airflow occurs in the cylinder and then the rotational flow is suppressed from attenuating. In such a way, the rotational flow generated in the cylinder is suppressed from attenuating with the pumping loss being reduced. This promotes the mixture of the air and the fuel and forms the stable combustion state. Also, in the intake apparatus of the above engine, the valve lift amount of the first intake valve may be larger than that of the second intake valve in a first half of the intake stroke.

In the above intake apparatus of the engine, the first intake valve may open before the second intake valve opens. Therefore, the flesh air flows through the first intake passage and then generates the rotational flow, while the first intake valve is opening and the second intake valve is closing. In the above intake apparatus of the engine, the first intake valve may close before the second intake valve closes. Therefore, the fresh air flows through the second intake passage so as to maintain the rotational flow, while the first intake valve is closing and the second intake valve is opening.

The above intake apparatus of the engine may include an introduction portion introducing rotational flow generated in the cylinder toward the second passage. This configuration improves the airflow velocity flowing through the second passage. This improves the rotational flow velocity in the cylinder, thereby suppressing the rotational flow from attenuating.

Further, the introduction portion may be a guide that is formed such that the rotational flow flows from a wall of the cylinder toward the second passage. This configuration suppresses the generation of the flow in such a direction as to attenuate the rotational flow of the gas flowing toward the second passage. This suppresses the rotational flow from attenuating, thereby promoting the mixture of the air and the fuel.

The above intake apparatus of the engine may includes a control valve opening and closing the second intake passage and arranged on the second intake passage, and the control valve may close in a period while the first intake valve opens and the second intake valve opens, and the control valve may open in a period while the first intake valve closes and the second intake valve opens. With this configuration, the air-fuel mixture is supplied only from the first intake passage to the cylinder in closing the control valve, thereby generating the unbalance of the airflow in the cylinder to generate the rotational flow. Also, the air flows only through the second intake passage at the time of opening an opening/closing valve, thereby further promoting the unbalance of the air flow to suppress the rotational flow from attenuating. Thus, the rotational flow maintains the turbulence of the air-fuel mixture in the cylinder, thereby ensuring the stable combustion.

Further, the above intake apparatus of the engine may includes a second passage injection valve injecting fuel to the second intake passage, and the second passage injection valve may inject the fuel when the second intake valve opens. With this configuration, the fuel is injected in the direction opposite to the direction in which the air flows from the cylinder to the second passage, thereby promoting the atomization of the fuel. This improves the combustion efficiency.

Furthermore, the above intake apparatus of the engine may include: a first passage injection valve injecting fuel to the first intake passage; and a second passage injection valve injecting fuel to the second intake passage, the first passage injection valve may finish injection of the fuel before the first intake valve opens, and the second passage injection valve may inject the fuel when the second intake valve opens. This configuration reduces the air-fuel mixture to flow out at the time of the valve overlap. The first intake valve advances to open, whereby there is a period while the first intake valve overlaps an exhaust valve. The injection in the first intake passage is finished before the first intake valve opens in the present invention, thereby reducing the air-fuel mixture to flow out to the exhaust side. This improves the fuel consumption and the emission. Further, the fuel injected in the second passage side is atomized to improve the combustion efficiency.

Effects of the Invention

A control apparatus of an engine according to the present invention reduces the pumping loss, suppresses the rotational flow generated in a cylinder from attenuating, and promotes the mixture of air and fuel to form a stable combustion state.

BRIEF DESCRIPTION OF THE DRAWINGS

FIG. 1A is a front view of the intake apparatus, and FIG. 1B is a plane view of the intake apparatus;

FIG. 3A illustrates the cylinder viewed from its upper side, and FIG. 3B is a cross section taken along line A-A;

FIG. 5A illustrates a state where the second intake valve opens and the intake control valve closes, and FIG. 5B illustrates a state where the intake control valve opens with the second intake valve opening;

MODES FOR CARRYING OUT THE INVENTION

Embodiments will be described in detail with reference to drawings.

First Embodiment

Figure 1A:
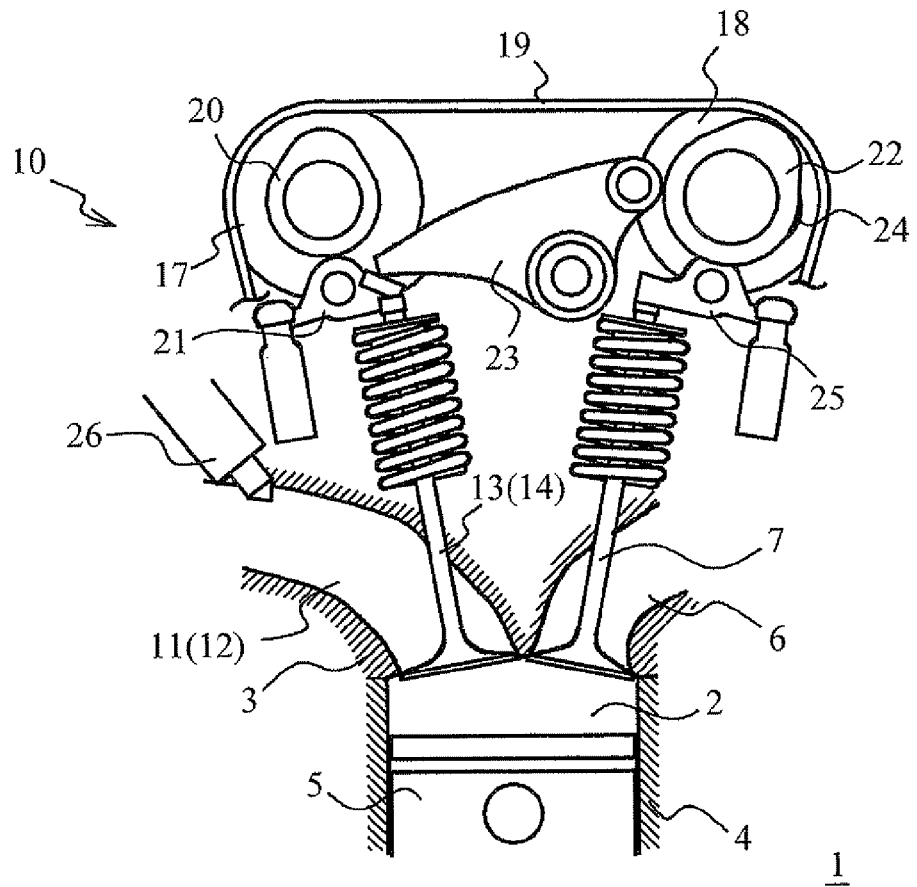
FIGS. 1A and 1B are an explanatory views of an intake apparatus of a first embodiment.
Figure 1B:
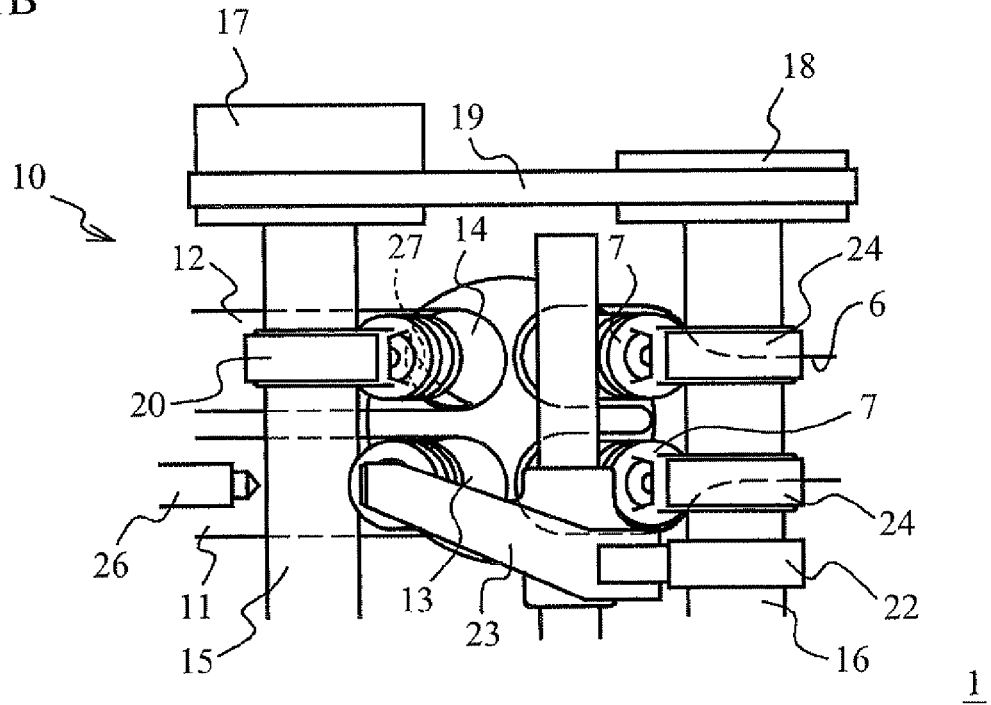

A first embodiment will be described with reference to drawings. FIGS. 1A and 1B are explanatory views of an intake apparatus 10 of the first embodiment. FIG. 1A is a front view of the intake apparatus 10, and FIG. 1B is a plane view of the intake apparatus 10. The intake apparatus 10 supplies fresh air to a cylinder 2 installed in an engine 1, and is provided for every cylinder. The engine 1 in the present embodiment is a DOHC engine having four cylinders each having four valves. Here, a single cylinder 2 of them will be described.

The cylinder 2 is formed within a cylinder head 3 and a cylinder block 4. A piston 5 is housed in the cylinder 2 and is capable of reciprocating.

The intake apparatus 10 is provided with a first intake passage 11 and a second intake passage 12 as two intake passages supplying the fresh air to the cylinder 2. The first intake passage 11 and the second intake passage 12 are formed in the cylinder head 3. The first intake passage 11 and the second intake passage 12 are branched off from an intake manifold (not illustrated) and are arranged in parallel to be connected to the cylinder 2. The first intake passage 11 is provided at its opening with a first intake valve 13 for opening and closing the first intake passage 11. Also, the second intake passage 12 is provided at its opening with a second intake valve 14 for opening and closing the second intake passage 12.

Further, the intake apparatus 10 is provided with a first injector 26 for injecting the fuel to the first intake passage 11. Furthermore, the intake apparatus 10 is provided with a guide 27 in the second intake passage 12. This guide 27 introduces the rotational flow generated in the cylinder 2 to the second intake passage 12.

Moreover, the engine 1 is provided with an exhaust passage 6 that is branched off to two passages connected to the cylinder 2. The branched exhaust passages 6 are provided at their openings with exhaust valves 7 for opening and closing the exhaust passages 6, respectively.

The intake apparatus 1 is provided with a first camshaft 15 and a second camshaft 16. A variable valve mechanism 17 is assembled into one end of the first camshaft 15. The variable valve mechanism 17 is formed at its outer circumference with a gear. Also, a driven sprocket 18 is assembled into one end of the second camshaft 16. The outer circumference of the variable valve mechanism 17 and the driven sprocket 18 are connected to a drive sprocket (not illustrated) of a crank shaft side through a timing chain 19, and the rotation of the crank shaft is transmitted to the variable valve mechanism 17 and the driven sprocket 18. This rotates the first camshaft 15 and the second camshaft 16. The variable valve mechanism 17 is provided with a vane type VVT (Variable Valve Timing) controller having hydraulic chambers. This VVT controller adjusts the hydraulic pressure such that the vanes rotate, which enables the first camshaft 15 to advance or retard.

A second intake cam 20 is assembled into the first camshaft 15. The second intake cam 20 presses down the second intake valve 14 through a rocker arm 21 so as to open the second intake passage 12. On the other hand, two exhaust cams 24 and a first intake cam 22 are assembled into the second camshaft 16. The first intake cam 22 presses down the first intake valve 13 through a roller rocker 23 so as to open the first intake passage 11. Also, the exhaust cam 24 presses down the exhaust valve 7 through the locker arm 25 so as to open the exhaust passage 6.

Figure 2:
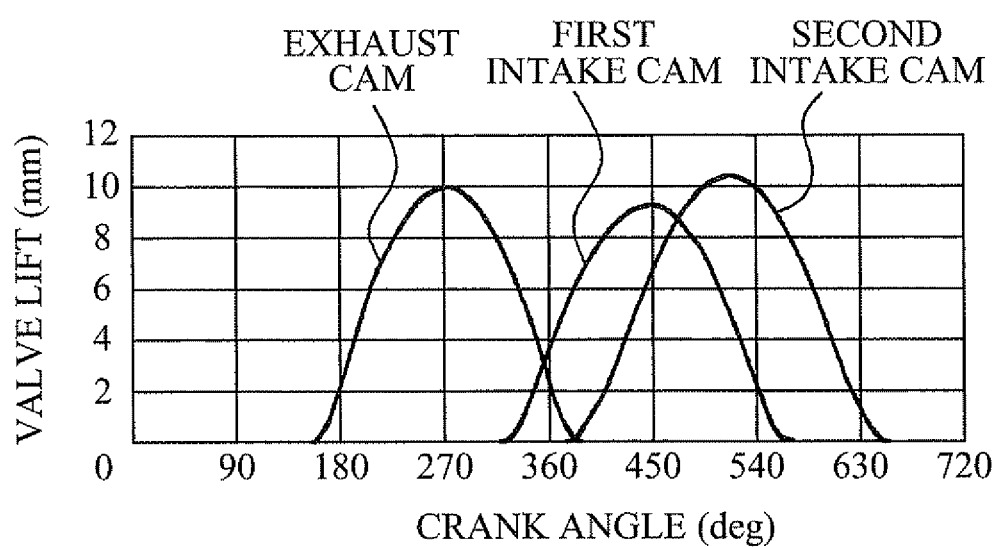
FIG. 2 is a view of characteristics of a first intake cam, a second intake cam, and an exhaust cam.

Herein, a description will be given of characteristics of the first intake cam 22, the second intake cam 20, and the exhaust cam 24. FIG. 2 is a view of characteristics of the first intake cam 22, the second intake cam 20, and the exhaust cam 24. In FIG. 2, the piston 5 is located in the top dead center at 0 degrees (=720 degrees) and 360 degrees. As illustrated in FIG. 2, the first intake cam 22 is formed to start lifting the valve at an advancing side relative to the top dead center (360 degrees). Thus, the opening timing of the first intake valve 13 advances relative to the top dead center. On the other hand, the timing when the second intake cam 20 starts lifting the valve is controlled by the VVT controller. The timing when the second intake cam 20 starts lifting the valve can advance to be identically set to the opening timing of the first intake valve 13, and can retard relative to the top dead center. Additionally, in FIG. 2, the second intake cam 20 starts lifting the valve at the retard side relative to the top dead center. Also, a working angle of the second intake cam 20 is formed to be higher than that of the first intake cam 22. That is, a period while the second intake valve 14 opens is longer than a period while the first intake valve 13 opens. Therefore, the second intake valve 14 closes later than the first intake valve 13 closes. Additionally, referring to FIG. 2, the second intake valve 14 closes by about 90 degrees later than the first intake valve 13. That is, in the intake stroke of the intake apparatus 1, the valve lift amount of the first intake valve 13 differs from that of the second intake valve 14, and there is a period while the valve lift amount of the first intake valve 13 is lager than that of the second intake valve 14. In particular, in the first half of the intake stroke, the valve lift amount of the first intake valve 13 is lager than that of the second intake valve 14. The cam characteristics are set in such a way, so that there is a period while both of the exhaust valve 7 and the first intake valve 13 open, that is, an overlap period. Also, there are a period while the first intake valve 13 opens and the second intake valve 14 closes (hereinafter referred to as "a first intake period"), a period while both of the first intake valve 13 and the second intake valve 14 open (hereinafter referred to as "the second intake period"), and a period while the first intake valve 13 closes and the second intake valve 14 opens (hereinafter referred to as "the third intake period").

Figures 3A, 3B:
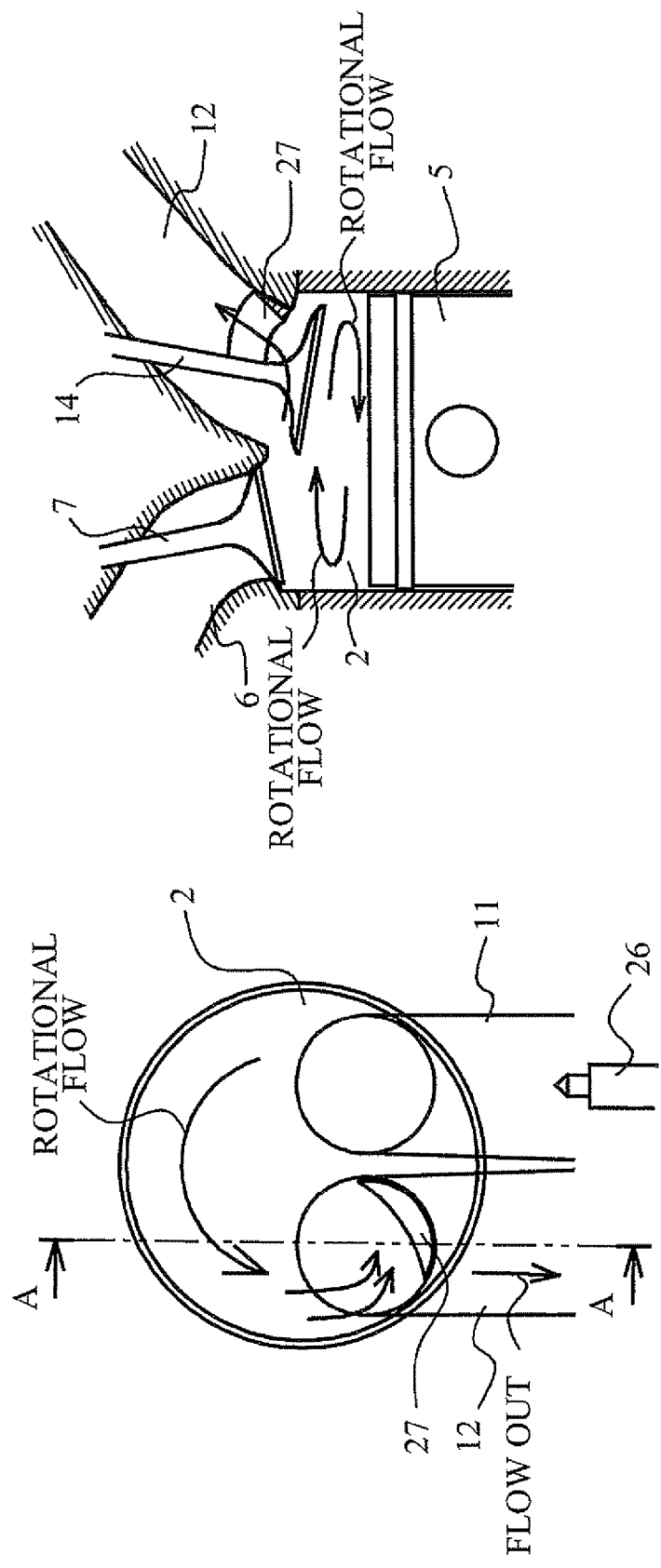
FIGS. 3A and 3B are explanatory views of the air flow generated in a cylinder in a period while the first intake valve closes and the second intake valve opens.

Next, a description will be given of the air flow generated in the cylinder 2 of the engine 1 in the intake stroke in this embodiment. FIGS. 3A and 3B are explanatory views of the air flow generated in the cylinder 2 in the above third intake period. FIG. 3A illustrates the cylinder 2 viewed from its upper side. FIG. 3B is a cross section taken along line A-A. In FIG. 3A, the first intake passage 11 and the second intake passage 12 are illustrated, but the exhaust passage 6 is omitted. In FIG. 3B, the second intake passage 12 and the exhaust passage 6 are illustrated.

When air intake starts, only the first intake valve 13 opens in the first intake period in the cam characteristic of FIG. 2, so that the flesh air is supplied only from the first intake passage 11 side to the cylinder 2. This generates the imbalance flow in the cylinder 2, and the counterclockwise rotational flow occurs. This rotational flow promotes the mixture of the air and the fuel. Next, the second intake valve 14 opens in the second intake period, so that the flesh air is also introduced from the second intake passage 12 side.

Moreover, the third intake period starts and the first intake valve 13 closes at the timing of starting the compression stroke. Afterward, the second intake valve 14 is also in the opening state. Thus, the flesh air flows to the second intake passage 12 side. The flow to this second intake passage 12 generates the counterclockwise rotational flow in the cylinder 2 as illustrated in FIGS. 3A and 3B. The rotational flow generated during this period has so low in the attenuation as to maintain the turbulence of the air-fuel mixture until the combustion, because the compression period of the air-fuel mixture is short after the second intake valve 14 closes. Further, the guide 27 provided in the second intake passage 12 obstructs the air which has flowed from the first intake passage 11 side toward the second intake passage 12 side. The guide 27 allows only the air, which has flowed from the outer circumstantial side within the cylinder 2 toward the second intake passage 12 side, in flowing theretoward. This assists the rotational flow in flowing toward the second intake passage 12. Therefore, the rotational flow in the cylinder 2 is further strengthened, so the turbulence of the air-fuel mixture is maintained even after the second intake valve 14 closes. In such a way, the turbulence of the air-fuel mixture is maintained even after the second intake valve 14 closes, thereby making the air-fuel mixture uniform in the cylinder 2. This ensures the stable combustion.

Additionally, the VVT controller is capable of controlling the closing timing of the second intake valve 14 as mentioned above. Thus, under the high speed and high load condition of the engine 1, the VVT controller sets the closing timing of the second intake valve 14 to be suitable for maintaining the rotational flow. Therefore, the engine 1 ensures the high torque and high output state.

As mentioned above, in the intake apparatus 10 of the present embodiment, there are the period while the first intake valve 13 opens and the second intake valve 14 closes during the intake stroke, and the period while the first intake valve 13 closes and the second intake valve 14 opens during the intake stroke. Therefore, in the period while the first intake valve 13 opens and the second intake valve 14 closes during the intake stroke, the rotational flow is generated along the inner circumferential wall of the cylinder 2. Further, in the period while the first intake valve 13 closes and the second intake valve 14 opens during the middle of the compression stroke, the rotational flow flows to the intake side. Since this rotational flow flows only toward the second passage of the intake side, the unbalance of the airflow occurs in the cylinder to suppress the rotational flow from attenuating. Also, this flow causes the air to flow out of the cylinder 2, thereby making the expansion ratio higher than the compression ratio so as to reduce the pumping loss. In such a way, the rotational flow is suppressed from attenuating with the pumping loss reduced, thereby promoting the mixture of the air and the fuel to form the stable combustion state. This enhances the EGR-resistant characteristic, thereby improving the fuel consumption.

Second Embodiment

Next, a second embodiment according to the present invention will be described. An intake apparatus 30 of the present embodiment is substantially the same as the intake apparatus 10 of the first embodiment. However, the intake apparatus 30 of the present embodiment differs from the intake apparatus 10 of the first embodiment in that an intake control valve 31 is provided for opening or closing the second intake passage 12 in the intake apparatus 30. This intake control valve 31 closes in the period while the first intake valve 13 opens and the second intake valve 14 opens, whereas the intake control valve 31 opens in the period while the first intake valve 13 closes and the second intake valve 14 opens. Additionally, the other configurations of the intake apparatus 30 are the same as those of the intake apparatus 10 of the first embodiment, so the detailed descriptions of the same configuration elements as those of the intake apparatus 10 are omitted and the present embodiment will be described with the same reference numerals.

Figure 4:
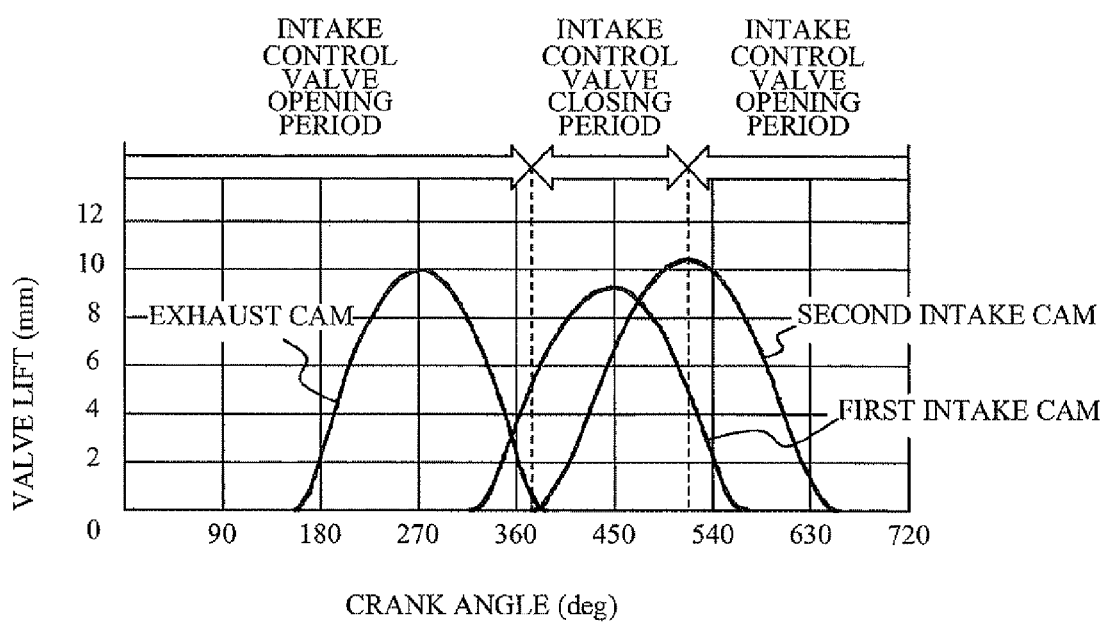
FIG. 4 is an explanatory view of opening and closing timings of an intake control valve.

FIG. 4 is an explanatory view of the opening and closing timings of the intake control valve 31. FIG. 4 is the explanatory view of the illustration of FIG. 2, in the first embodiment, added with the opening and closing timings of the intake control valve 31. The intake control valve 31 and the second intake valve 14 close substantially at the same time. The intake control valve 31 opens at the timing when the first intake valve 13 closes. Here, in consideration of a long period from the time when the valve opens or closes to the time when the air flow occurs, the intake control valve 31 has already opens before the first intake valve 13 closes. Also, the intake control valve 31 opens in the period other than above one.

Figure 5A:
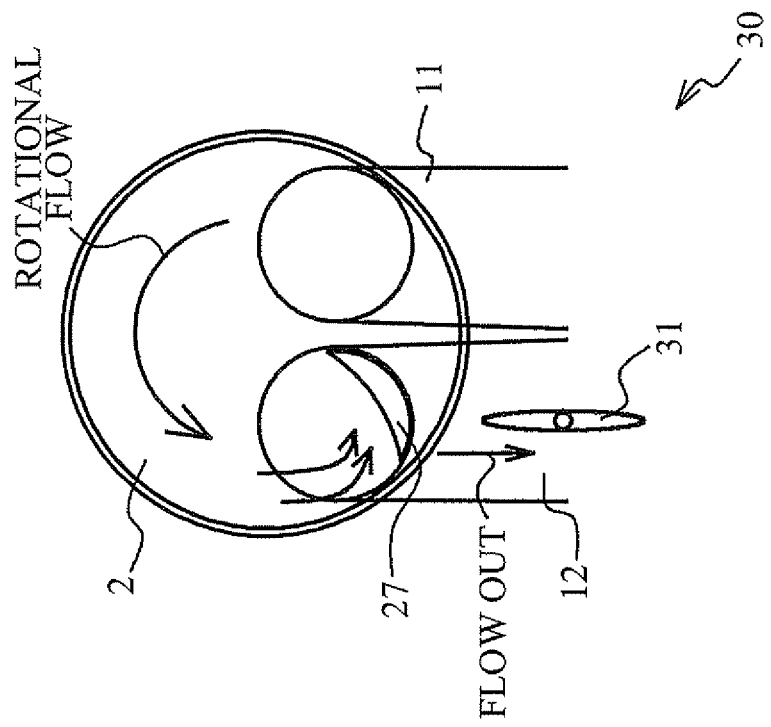
FIGS. 5A and 5B are explanatory views of the air flow generated in the cylinder in a second embodiment.
Figure 5B:
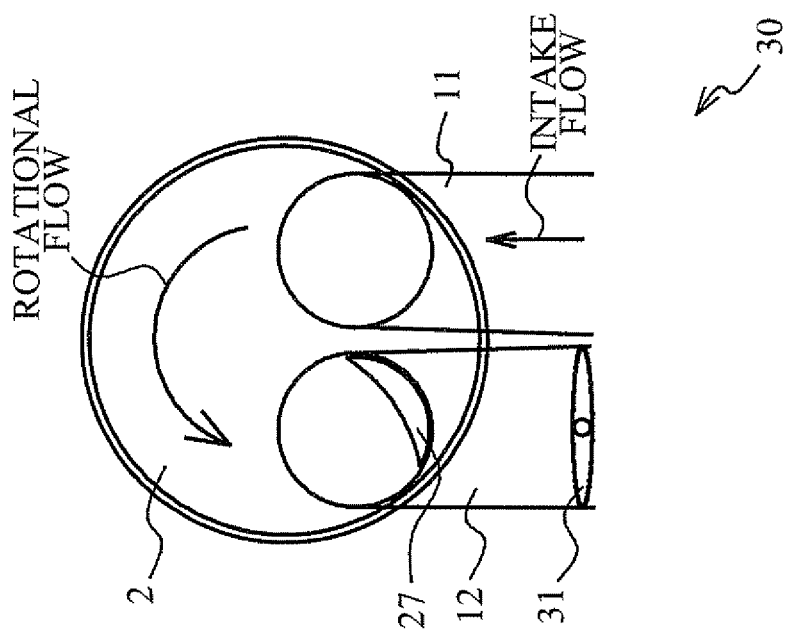

FIGS. 5A and 5B are explanatory views of the air flow generated in the cylinder 2. FIG. 5A illustrates a state where the second intake valve 14 opens and the intake control valve 31 closes, and FIG. 5B illustrates a state where the intake control valve 31 opens with the second intake valve 14 opening.

In the closing period of the intake control valve 31 illustrated in FIG. 4, the intake control valve 31A closes at the same time when the second intake valve 14 opens, whereby the air flow is not generated in the second intake passage 12. Thus, in this period while the intake control valve 31 closes, the air is supplied to the cylinder 2 only from the first intake passage 11, and the unbalance flow occurs in the cylinder 2, thereby promoting the generation of the rotational flow as illustrated in FIG. 5A. After that, the intake control valve 31 opens at the timing when the first intake valve 13 closes, and then the air flows from the cylinder 2 toward the second intake passage 12. This suppresses the rotational flow from attenuating, thereby increasing the turbulence of the airflow in the cylinder 2, as illustrated in FIG. 5B. Therefore, the turbulence of the airflow is maintained even after the second intake valve 14 closes, which spreads the air-fuel mixture to achieve the stable combustion. Additionally, the same effect is obtained even if the guide 27 is not provided in the present embodiment.

Third Embodiment

Figure 6:
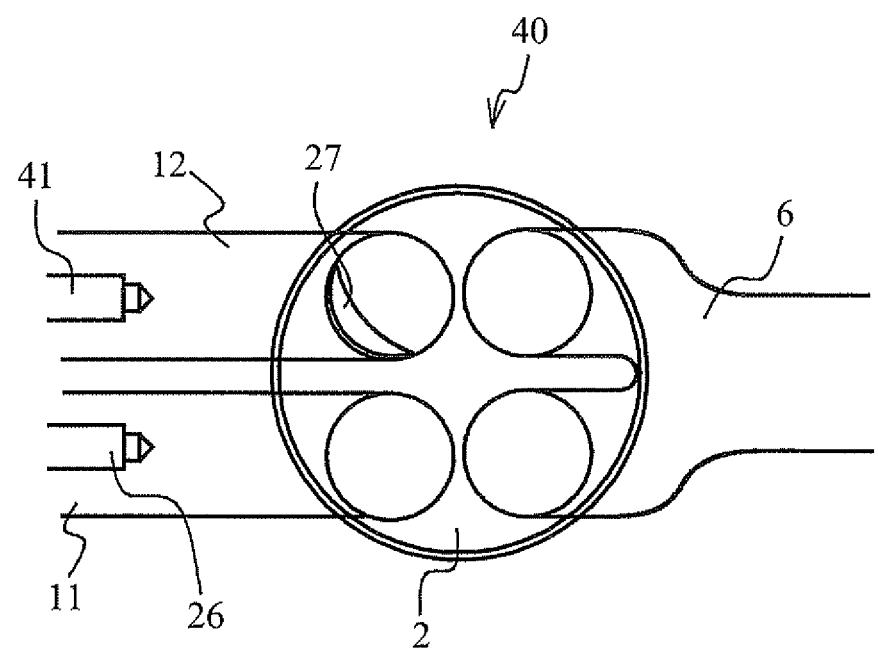
FIG. 6 is an explanatory view illustrating a schematic configuration of the cylinder, the first intake passage, the second intake passage, and the exhaust passage in an intake apparatus of a third embodiment.

Next, a third embodiment according to the present invention is described. FIG. 6 is an explanatory view illustrating a schematic configuration of the cylinder 2, the first intake passage 11, the second intake passage 12, and the exhaust passage 6 in an intake apparatus 40 of the present embodiment. The intake apparatus 40 of the present embodiment is substantially the same as the intake apparatus 1 of the first embodiment. However, the intake apparatus 40 of the present embodiment differs from the intake apparatus of the first embodiment in that the intake apparatus 40 is provided with a second injector 41 for the fuel injection in the second intake passage 12. Additionally, the other configurations of the intake apparatus 40 are the same as those of the intake apparatus 10 of the first embodiment, so the detailed descriptions of the same configuration elements as the intake apparatus 10 are omitted and the present embodiment will be described with the same reference numerals.

Figure 7:
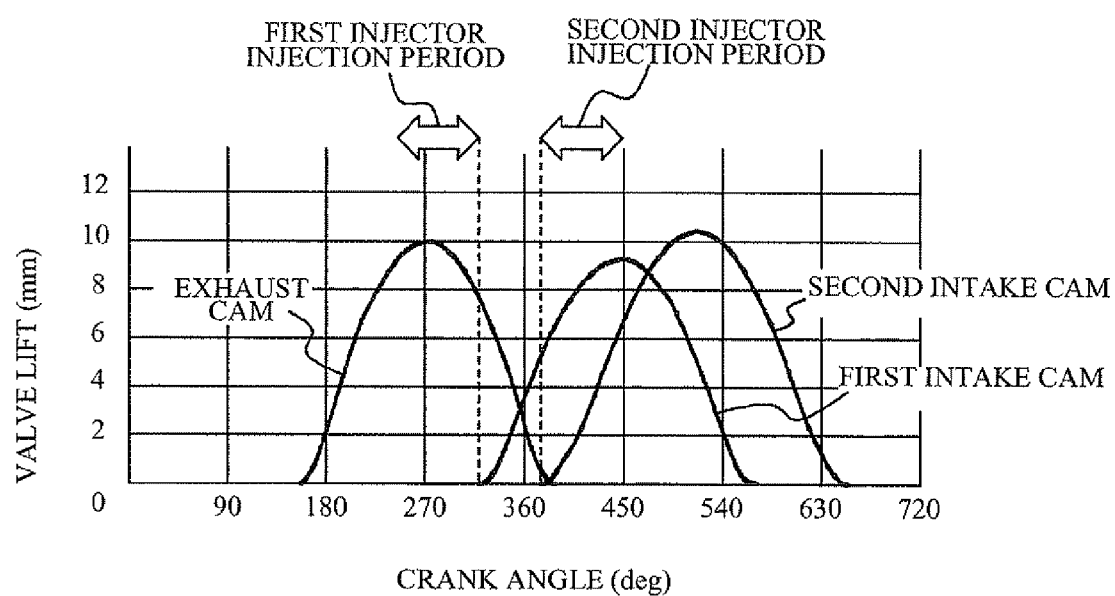
FIG. 7 is an explanatory view of injection timings of a first and second injectors.

FIG. 7 is an explanatory view of injection timings of a first injector 26 and a second injector 41. FIG. 7 is the explanatory view of the illustration of FIG. 2, in the first embodiment, added with the injection timing of the first injector 26 and the second injector 41. As illustrated in FIG. 7, the first injector 26 performs the intake-asynchronous injection, and finishes the injection before the first intake valve 13 opens. On the other hand, the second injector 41 performs the intake-asynchronous injection, and injects the fuel at the time when the second intake valve 14 opens.

In the above manner, the second injector 41 is provided, whereby the second injector 41 injects a part of the fuel, which is injected by the first injector 26 in case of providing the first injector only. This reduces the air-fuel mixture flowing through the exhaust side at the valve overlap time of the first intake valve 13 and the exhaust valve 7, thereby improving the fuel consumption and the emission. Also, in the second intake passage 12 side, the fuel injected by the second injector 41 faces the air flowing through the second intake passage 12, which atomizes the fuel spray. Therefore, the fuel vaporization is promoted to reduce the intake air temperature, thereby increasing the volumetric efficiency and improving the output. Additionally, the same effect is obtained without the guide 27 in the present embodiment.

While the exemplary embodiments of the present invention have been illustrated in detail, the present invention is not limited to the above-mentioned embodiments, and other embodiments, variations and modifications may be made without departing from the scope of the present invention.

For example, in above examples, the variable valve mechanism 17 may vary the working angle of the valve timing of the second intake valve 14. Also, the second camshaft 16 is assembled with a variable valve mechanism such that a valve timing of the first intake valve 13 is variable. This flexibly controls the intake air in the cylinder 2, and improves the combustion efficiency.

DESCRIPTION OF LETTERS OR NUMERALS

1 engine
2 cylinder
6 exhaust passage
7 exhaust valve
10, 30, 40 intake apparatus
11 first intake passage
12 second intake passage
13 first intake valve
14 second intake valve
15 first camshaft
16 second camshaft
17 variable valve mechanism
18 driven sprocket
19 timing chain
20 second intake cam
21 rocker arm
22 first intake cam
23 roller rocker
26 first injector
27 guide
31 intake control valve
41 second injector

The invention claimed is:

1. An intake apparatus of an engine comprising:
a first intake passage supplying fresh air to a cylinder;
a second intake passage arranged near the first intake passage, and supplying fresh air to the cylinder;
a first intake valve opening and closing the first intake passage at an aperture of the first intake passage;
a second intake valve opening and closing the second intake passage at an aperture of the second intake passage; and
an introduction portion introducing rotational flow generated in the cylinder toward the second intake passage,
wherein the first intake passage and the second intake passage are arranged side by side,
wherein the introduction portion is a guide that is provided in the second intake passage,
wherein an opening timing of the first intake valve advances relative to a top dead center, and
a valve lift amount of the first intake valve differs from that of the second intake valve, and there is a period while the valve lift amount of the first intake valve is larger than that of the second intake valve, in an intake stroke, whereby an intake air flows out to the second intake passage.

2. The intake apparatus of the engine of claim 1, wherein the valve lift amount of the first intake valve is larger than that of the second intake valve in a first half of the intake stroke.

3. The intake apparatus of the engine of claim 1, wherein the first intake valve opens before the second intake valve opens.

4. The intake apparatus of the engine of claim 1, wherein the first intake valve closes before the second intake valve closes.

5. The intake apparatus of the engine of claim 1, wherein the guide is formed such that the rotational flow flows from a wall of the cylinder toward the second intake passage.

6. The intake apparatus of the engine of claim 1, further comprising a control valve opening and closing the second intake passage and arranged on the second intake passage,
wherein the control valve closes in a period while the first intake valve opens and the second intake valve opens, and the control valve opens in a period while the first intake valve closes and the second intake valve opens.

7. The intake apparatus of the engine of claim 1, further comprising a second passage injection valve injecting fuel to the second intake passage,
wherein the second passage injection valve injects the fuel when the second intake valve opens.

8. The intake apparatus of the engine of claim 1, further comprising:
a first passage injection valve injecting fuel to the first intake passage; and
a second passage injection valve injecting fuel to the second intake passage,
wherein the first passage injection valve finishes injection of the fuel before the first intake valve opens, and the second passage injection valve injects the fuel when the second intake valve opens.

* * * * *